United States Patent [19]

Arnold

[11] Patent Number: 5,163,628
[45] Date of Patent: Nov. 17, 1992

[54] FOOD SLICER

[76] Inventor: Gerhard Arnold, Schenkendorfstrasse 7, Wiesbaden, Fed. Rep. of Germany, D-6200

[21] Appl. No.: 665,797

[22] Filed: Mar. 8, 1991

[30] Foreign Application Priority Data

Mar. 16, 1990 [DE] Fed. Rep. of Germany ....... 4008448

[51] Int. Cl.[5] .................. B02C 19/20; A47J 43/25
[52] U.S. Cl. ........................... 241/93; 83/355; 83/437; 241/273.3
[58] Field of Search .......... 83/437, 663, 355; 30/276; 241/93, 280, 273.1, 273.3; D7/381, 383, 414, 678

[56] References Cited

U.S. PATENT DOCUMENTS

| | | | |
|---|---|---|---|
| 67,616 | 8/1867 | Froben | 241/273.3 X |
| 633,188 | 9/1899 | Frick | 241/273.3 |
| 1,672,391 | 6/1928 | Mullikin | 241/93 X |
| 2,529,473 | 11/1950 | Rustici | 241/93 |
| 3,133,570 | 5/1964 | Leszczynski | 241/101 R |
| 4,227,656 | 10/1980 | Engebretsen | 241/93 |
| 4,523,505 | 6/1985 | Polson | 83/437 X |

FOREIGN PATENT DOCUMENTS

| | | |
|---|---|---|
| 437032 | 12/1939 | Belgium . |
| 46733 | 7/1888 | Fed. Rep. of Germany . |
| 391870 | 3/1924 | Fed. Rep. of Germany . |
| 583015 | 8/1933 | Fed. Rep. of Germany . |
| 1023200 | 1/1958 | Fed. Rep. of Germany . |
| 1429184 | 5/1969 | Fed. Rep. of Germany . |
| 2705991 | 9/1978 | Fed. Rep. of Germany . |
| 1040965 | 10/1953 | France . |
| 1323571 | 2/1962 | France . |
| 2542184 | 9/1984 | France . |

*Primary Examiner*—Frank T. Yost
*Assistant Examiner*—Clark F. Dexter
*Attorney, Agent, or Firm*—Wegner, Cantor, Mueller & Player

[57] ABSTRACT

A kitchen appliance for slicing food has a slicing cylinder arranged rotatably in a housing. Material to be sliced is pressed against the slicing cylinder by means of a pusher which can be moved into a feeding chamber. The wall of the feeding chamber located at the rear in the direction of rotation of the slicing is fixed. The pusher is guided pivotably and displaceably in its vicinity. To the front it has a terminating wall which, during pressing, slides on the outside beyond the housing and completely seals the feeding chamber.

7 Claims, 5 Drawing Sheets

FOOD SLICER

BACKGROUND OF THE INVENTION

1. Field of the Invention

This invention relates to a kitchen appliance having a slicing cylinder arranged rotatably in a housing.

2. Description of Background Art

A kitchen appliance of the above-mentioned type is available on the market as a grater for cheese. Similar appliances for slicing food have been known for many years. In the known kitchen appliance the pusher limits the feeding chamber towards the side opposite the slicing cylinder and further towards the front and towards the back. The feeding chamber is filled through an opening in a front wall of the feeding chamber This opening always remains open during use of the appliance. Care must therefore be taken to ensure that the opening points upwards at all times during use in order that no material to be sliced falls out of it.

The known appliance is particularly suitable for grating cheese. If one wishes to slice onions, for instance, in the appliance, then there are serious shortcomings. The most serious shortcoming would be that pieces of onion would be pressed by the slicing cylinder against the rear wall located in the direction of rotation of the slicing cylinder and would pass into the gap between said wall and the slicing cylinder. This would cause a jamming, as a result of which further pressing down of the pusher would be made more difficult or impossible.

A further disadvantage of the appliance which would become apparent when slicing onions is that the opening of the feeding chamber cannot be closed. As a result, when slicing onions, substances which are extremely irritating to the eyes can escape, which is unpleasant. Furthermore, the appliance cannot be used for storing a partially sliced onion because it is not sealed off from the outside.

SUMMARY OF THE INVENTION

The major object of the invention is to provide a kitchen appliance of the type mentioned in such a way that it is suitable for slicing onions. For this purpose, in particular, its feeding chamber should be capable of being completely closed after filling and there should be no risk of the pusher being jammed by the material to be sliced.

This object is achieved according to the invention in that the feeding chamber is limited on the side located in the direction of rotation of the slicing cylinder by a fixed wall and in that the pusher is mounted so as to be pivotable on the side located in the direction of rotation of the slicing cylinder about an axis extending parallel to the axis of the slicing cylinder and so as to be displaceable in the direction of the slicing cylinder and in that the pusher has a terminating wall on the side located opposite the direction of rotation of the slicing cylinder, which limits the feeding chamber and engages on the outside beyond the housing of the appliance.

As a result of this design, the material to be sliced is moved against a fixed wall instead of against a wall which can be displaced with the pusher. This means that a jamming of the pusher is prevented in a simple way. As the pusher completely seals off the feeding chamber together with the side walls and the rear wall in every stage of actuation, no unpleasant substances escape when the appliance is in use. Furthermore, it also becomes possible as a result to store material to be sliced in the appliance so that it is quickly ready for use when required.

The appliance according to the invention is particularly suitable for slicing onions because complete onion rings can be produced with it in a simple way which pass into the interior of the slicing cylinder during use of the appliance and fall out at the bottom. With the appliance according to the invention it is possible to let the sliced onion rings fall directly out of the appliance into the container provided. The lower outlet opening could, of course, also be designed to be closable so that the onion rings initially remain in the onion slicer, which is an advantage if the onion slicer is to be used at the table.

It should also be stressed that the appliance can be cleaned very easily.

According to an advantageous embodiment of the invention, the pusher can be moved in a simple way into the feeding chamber and, in order to open the feeding chamber, can be lifted up with its terminating wall if a guide groove is provided in each of the top and bottom walls near to the wall located in the direction of rotation of the slicing cylinder, with which guide groove the pusher engages with a pivot in each case.

In order to clean the appliance the pusher can be simply pulled out from the feeding chamber if the guide grooves extend up to the front edge of the respective walls.

The risk of the pusher tilting when being pushed into the feeding chamber can be counteracted by the top and bottom walls having a mutually facing ridge in each case close to their side opposite the direction of rotation of the slicing cylinder, which ridge engages in each case with a recess of the pusher.

Another very simple possibility of guiding the pusher when being pushed into the feeding chamber consists in a dovetail-type guide being provided in a front housing wall which is overlapped by the terminating wall of the pusher, into which dovetail-type guide the terminating wall is guided with side edges when the pusher is pushed down.

Squashing of onions in the feeding chamber by the tangentially directed slicing forces is prevented in a simple manner by the feeding chamber being designed to be essentially cylindrical and the terminating wall which engages over the housing blocking off a slit in the feeding chamber, which is of such dimensions that a finger or several fingers can reach through it. The circular shape additionally has the advantage that the material to be sliced is automatically centered in the feeding chamber.

If the appliance is designed for slicing onions of a relatively large volume then it can present difficulties or even become impossible to reach with the fingers over the pusher and at the same time over the fixed housing on the opposite side. If, according to an advantageous embodiment of the invention, an outwardly pointing gripping rib is provided on the housing in the region of the slicing cylinder on the side of the terminating wall, then in such cases it is possible, when the pusher has not yet been pushed far into the feeding chamber, to reach firstly behind this gripping rib, which means that a smaller span is required.

It is also beneficial if the outer surface of the housing has an outwardly facing bulge in the quarter of the slicing cylinder at the inlet side. Such a bulge makes it possible for pieces of onion which tear away from the onion and pass into the gap between housing and slicing cylinder to be able to fall out of the appliance as soon as they have reached this bulge.

The invention permits numerous embodiments. In order to make its basic principle more clear, several of them are shown in the drawing and are described below.

DESCRIPTION OF THE PREFERRED EMBODIMENT

Figure 1:
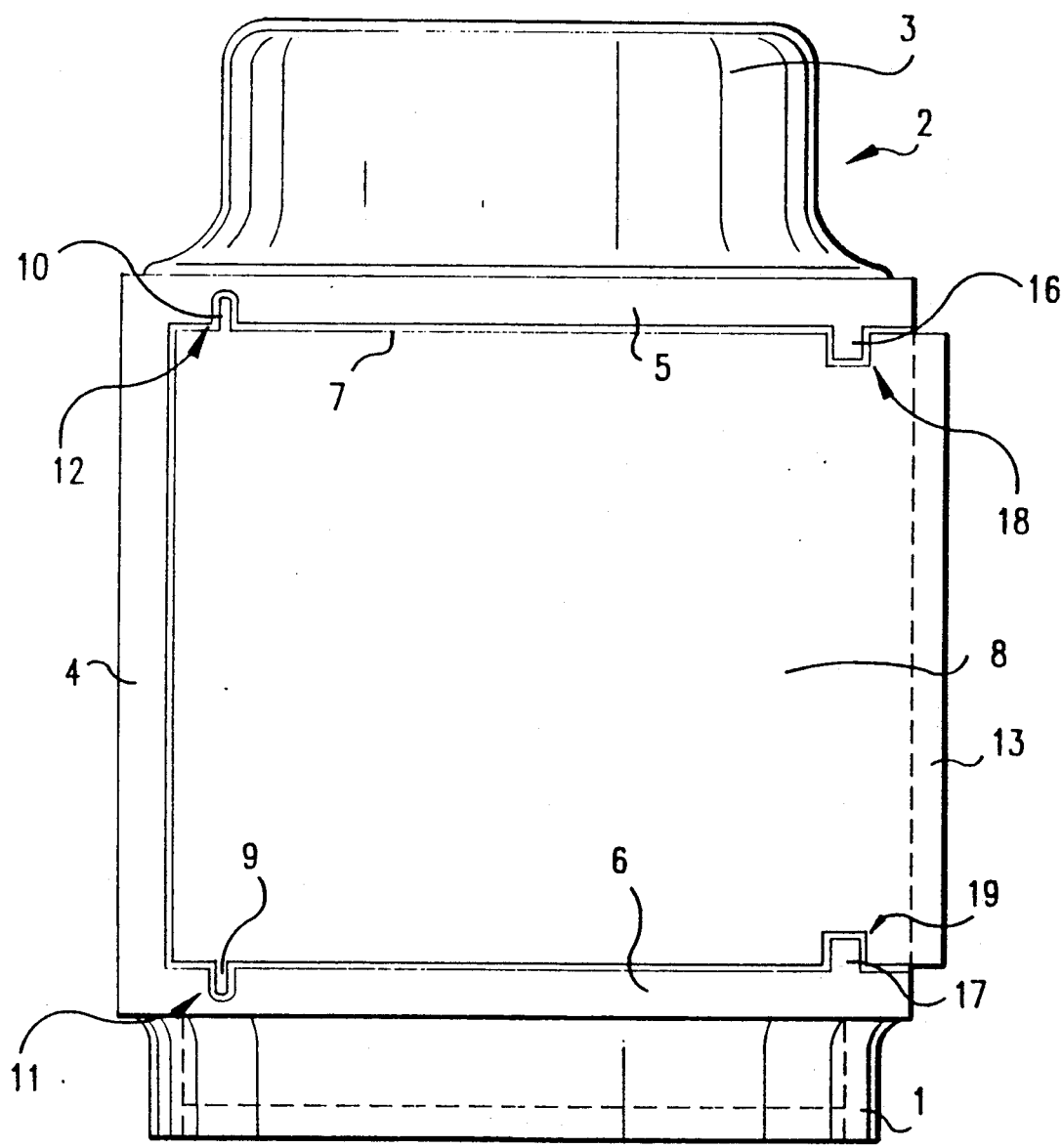
FIG. 1 is a front elevational view of a kitchen appliance according to the invention.

The kitchen appliance shown in FIG. 1 has a slicing cylinder 2 rotatable in a housing 1, of which slicing cylinder 2 only a handle 3, with which the slicing cylinder 2 is turned when using the appliance, is shown in FIG. 1.

Three fixed walls 4, 5, and 6 define on three sides a feeding chamber 7, which is sealed off at the top and front by a pusher 8. This pusher 8 has two pivots 9 and 10 on the top and bottom edges, which engage guide grooves 11 and 12 of the top and bottom walls 5 and 6, respectively. To the front the pusher 8 is integrally connected to a terminating wall 13 beyond the housing 1, as a result of which it becomes possible to move the pusher 8 into the feeding chamber 7.

FIG. 1 further reveals that the top and bottom walls 5 and 6 each have, close to the terminating wall 13, a mutually facing ridge 16 and 17, which engages in each case with a corresponding recess 18 and 19 of the pusher 8. The pusher 8 is consequently also guided along the side of the terminating wall without tilting.

Figure 2:
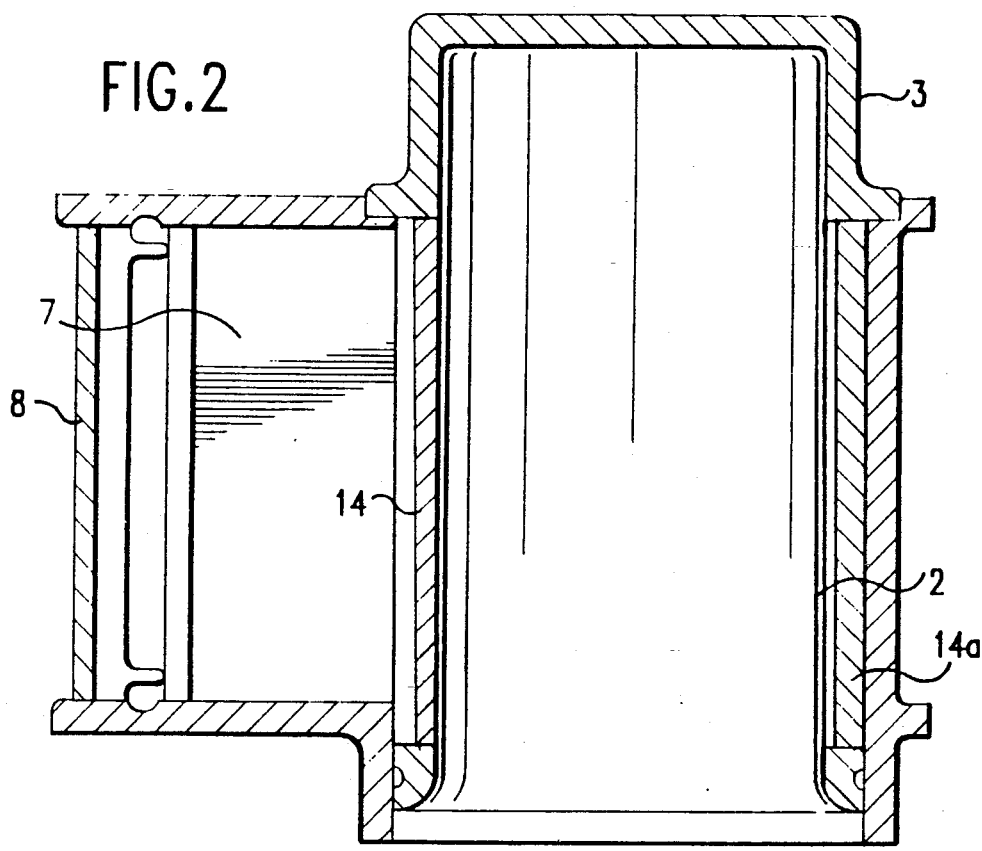
FIG. 2 is a side elevational view in longitudinal section along the line II—II in FIG. 3.

The sectional representation according to FIG. 2 shows that the slicing cylinder 2 has two blades 14 and 14a across the width of the feeding chamber 7, with which blades 14 and 14a onions, for example, are sliced when one turns the handle 3 and at the same time presses the pusher 8 into the feeding chamber 7.

Figure 3:
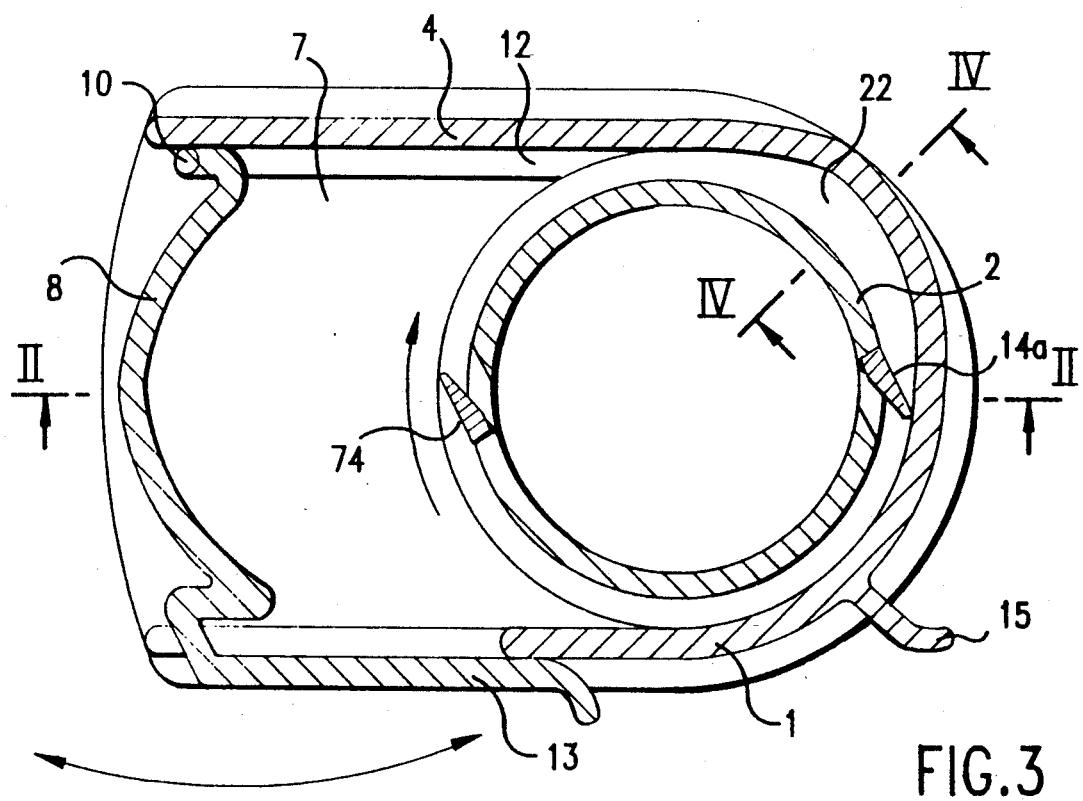
FIG. 3 is a cross-sectional view through the kitchen appliance seen from the top.

FIG. 3 shows clearly how the pusher 8 engages on one side with its pivot 10 with the guide groove 12 and how the terminating wall 13 slides over the housing 1, when the pusher 8 is pushed into the feeding chamber 7. During this displacing movement the pivot 10 slides rearwards in the guide groove 12. If one wishes to open the feeding chamber 7, this is possible at all times, by pivoting the pusher 8 around the pivot 10 and the pivot 9, which can be seen only in FIG. 1.

A considerable functional advantage is provided by a bulge in the housing 1, forming a refuse chamber 22, as is shown in Figure 3, in the region of the upper quarter of the slicing cylinder seen in FIG. 3. If a piece of onion should become detached and become initially jammed between the housing 1 and the slicing cylinder 2, then it passes into this refuse chamber after a very short distance and can fall out downwards.

FIG. 3 furthermore reveals a gripping rib 15 on the housing 1, behind which one can reach if the distance of the pusher 8 from the underside of the housing 1 is too great to be able to reach to the underside of the housing.

Figure 4:
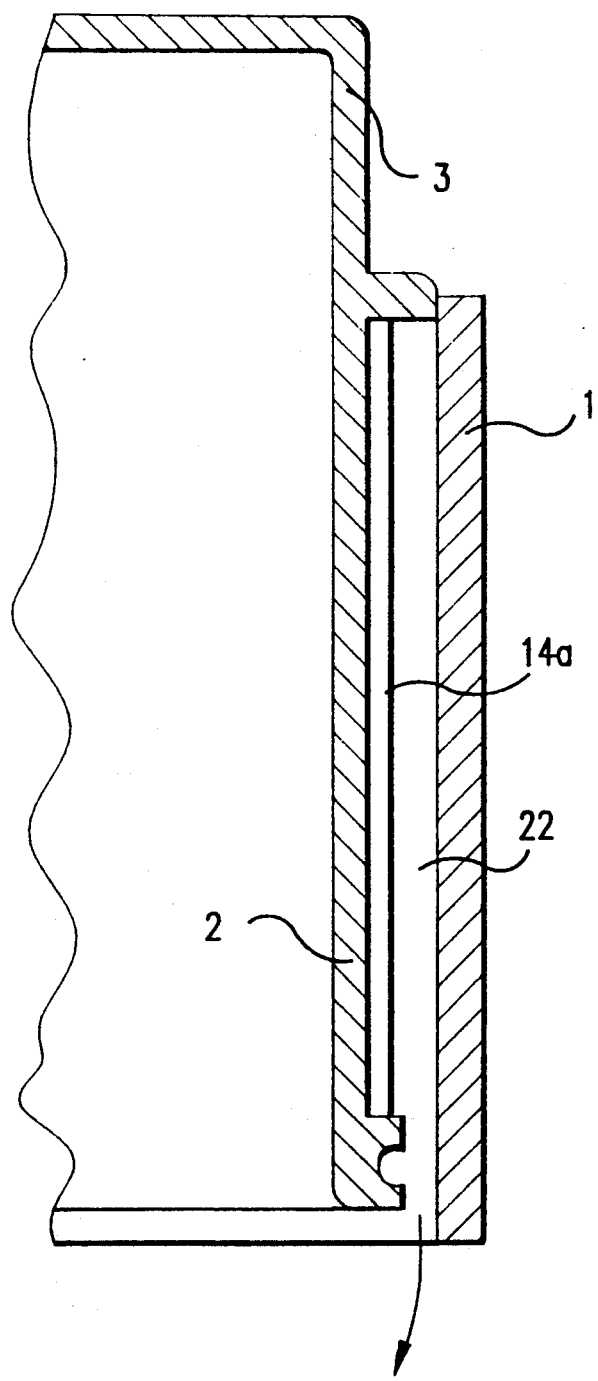
FIG. 4 is a cross-sectional view along the line IV—IV in FIG. 3.

FIG. 4 makes it clear that the refuse chamber 22 is open towards the bottom so that small pieces of onion which pass into it can fall out downwards out of the onion slicer.

Figure 5:
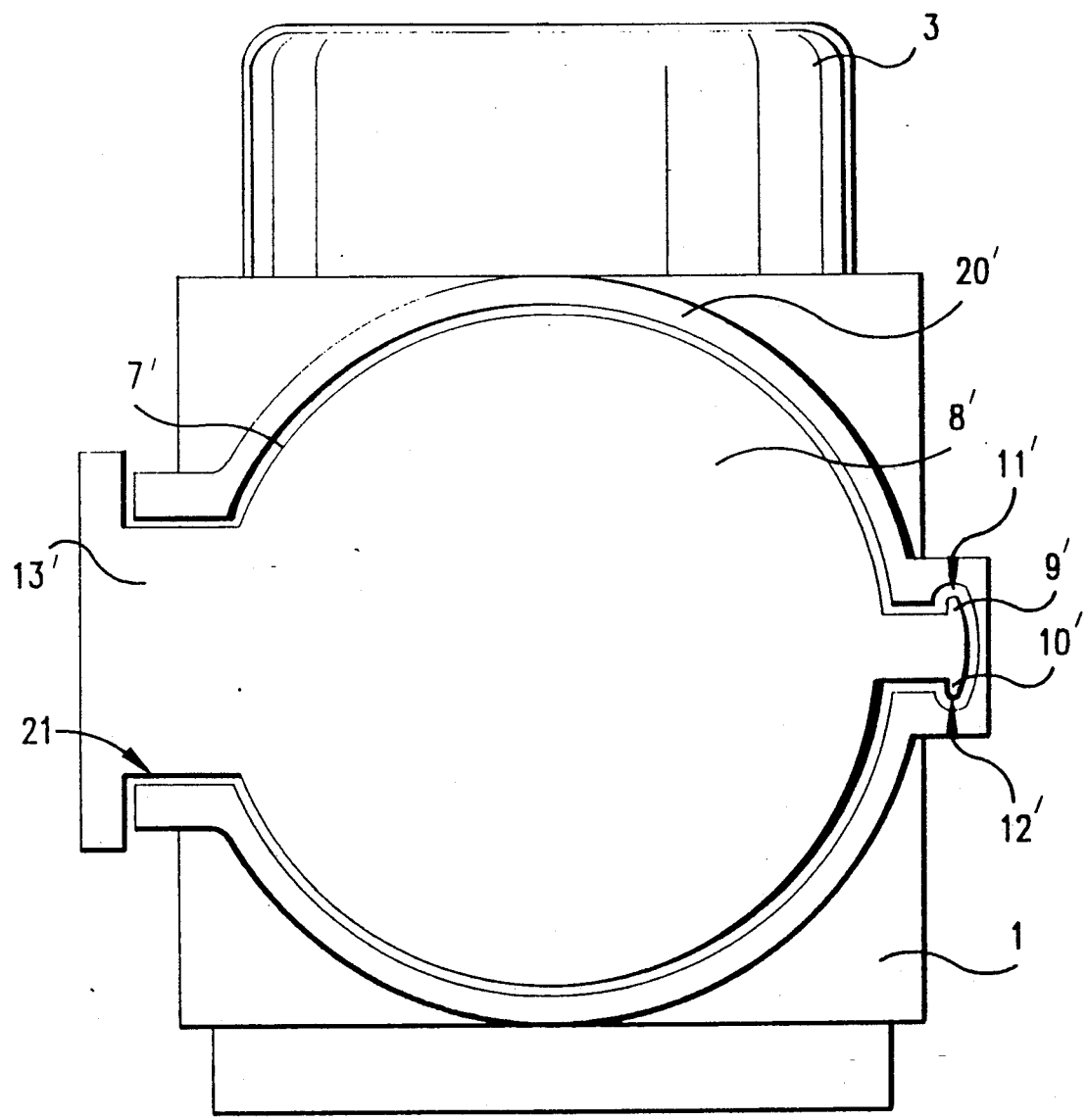
FIG. 5 is a front elevational view of a second embodiment of a kitchen appliance according to the invention.

In the embodiment according to FIG. 5 the feeding chamber 7' is of cylindrical design. The pusher 8' accordingly has an approximately circular cross-section when viewed from one end. The wall 20 of the feeding chamber 7' matches the curvature of pusher 8', in order to guide the pusher 8' - exactly as with the embodiment already explained - pivotably and displaceably by means of pivots 9' and 10' engaging with guide grooves 11' and 12'.

The wall 20' of the feeding chamber 7' reaches so far to the side of the terminating wall 13' that only a slit 21 with a relatively narrow width remains, through which one can reach with one finger or several when pressing down the pusher 8' which has a terminating wall that fits through the slit and has substantially the same width as the slit.

Figure 6:
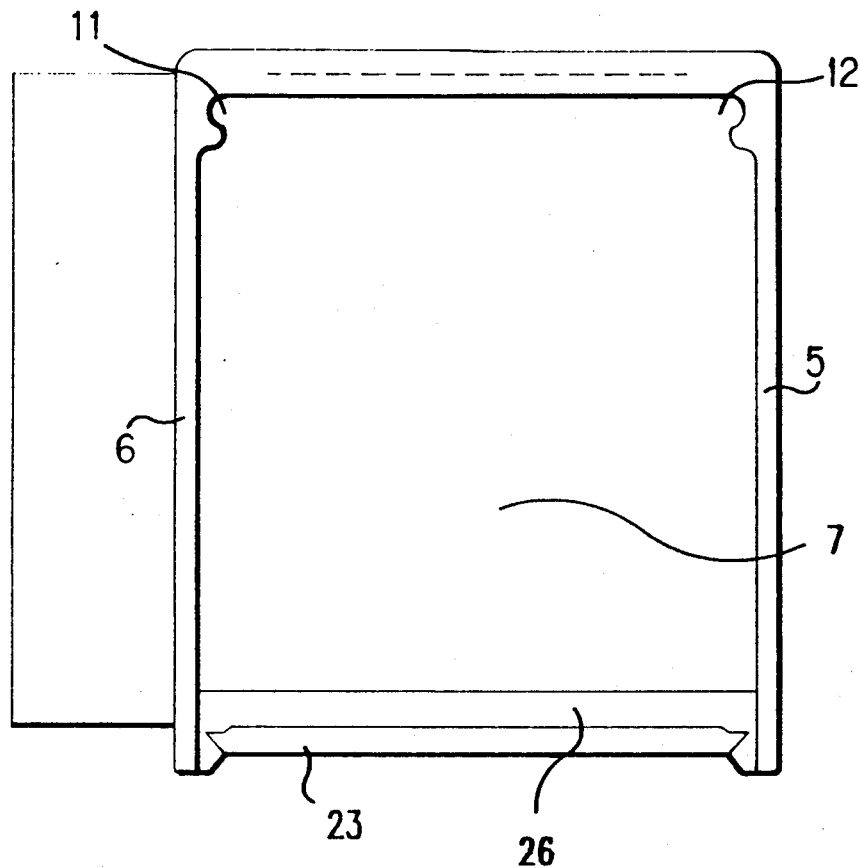
FIG. 6 is a front elevational view of the housing of another embodiment of the kitchen appliance.
Figure 7:
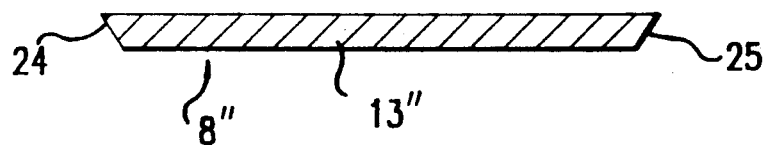
FIG. 7 is a horizontal section through the front terminating wall of a pusher of the kitchen appliance.

In the embodiment according to FIG. 6, a dovetail-type guide 23 is provided in a housing wall 26 connecting the side walls 5 and 6. This guide extends on the front side of the appliance upwards far enough to meet the terminating wall 13" of the pusher 8", shown in section in FIG. 7, such that beveled edges 24 and 25 are able to pass into the guide 23 after the pusher 8" is closed over the feeding chamber 7. If the pusher 8" is pushed towards the slicing cylinder 2 then the terminating wall 13" is guided by this guide 23. As a result, the feeding chamber 7 cannot be opened as long as the pusher B is not in the position most remote from the slicing cylinder 2, where the terminating wall passes out of the guide and therefore pivoting pivots 9 and 10 becomes possible.

What is claimed is:

1. An appliance for slicing food, comprising a housing having two ends; a slicing cylinder arranged rotatably at one end of said housing; a feeding chamber at the other end of said housing, said housing comprising top and bottom walls and a fixed side wall which, together with said slicing cylinder, define said feeding chamber which is open at the other end of the housing opposite the slicing cylinder, said housing further comprising a guide groove in each of the top and bottom walls near to the fixed side wall, each guide groove running parallel to a plane formed by the fixed side wall; and a pusher comprising a pair of pivots on one end, wherein said pusher is mounted pivotably and slidably in the guide grooves by said pivots, said pivots are slidable in said guide grooves such that the pusher can be pivoted open and shut relative to the feeding chamber and also can be displaced along the guide grooves towards the slicing cylinder; and wherein said pusher has a terminating wall on an end located opposite the end with said pivots, which encloses the feeding chamber by engaging an outside portion of the housing.

2. An appliance for slicing food as claimed in claim 1, wherein the guide grooves extend along the top and bottom walls to the open end of the feeding chamber opposite the slicing cylinder.

3. An appliance for slicing food as claimed in claim 1, wherein the top and bottom walls each have a mutually facing ridge remote from the fixed side wall, and the pusher has a pair of recesses corresponding to each at the end opposite the pivots which engage with said ridges.

4. An appliance for slicing food as claimed in claim 1, wherein said housing further comprises a second side wall on a side opposite the fixed side wall, wherein said second side wall has a dovetail-type guide which is overlapped by the terminating wall of the pusher, and said terminating wall has beveled edges, said terminating wall being guided into said dovetail-type guide when the pusher is pushed into said chamber.

5. An appliance for slicing food as claimed in claim 1, wherein the feeding chamber is essentially cylindrical and the top and bottom walls of the housing are semicircular and separated by a slit on the side opposite the fixed side wall, said slit has a width such that a finger or several fingers can reach through, said slit running parallel to the plane of said fixed side wall, and wherein said terminating wall fits through said slit and has a width substantially matching the width of said slit.

6. An appliance for slicing food as claimed in claim 1, wherein an outwardly pointing gripping rib is provided on the outside of the housing at the end with of the slicing cylinder on the side of the terminating wall.

7. An appliance for slicing food as claimed in claim 1, wherein the outer surface of the housing has an outwardly facing bulge, wherein said bulge is located at the end of the housing with the slicing cylinder on the side opposite the terminating wall.

* * * * *